US 008550807B2

(12) United States Patent
Kolbet (10) Patent No.: US 8,550,807 B2
(45) Date of Patent: Oct. 8, 2013

(54) IN-MOLD PUNCH APPARATUS AND METHODS

(75) Inventor: Randall A. Kolbet, Liberty Township, OH (US)

(73) Assignee: Advanced Drainage Systems, Inc., Hilliard, OH (US)

( * ) Notice: Subject to any disclaimer, the term of this patent is extended or adjusted under 35 U.S.C. 154(b) by 972 days.

(21) Appl. No.: 12/128,192

(22) Filed: May 28, 2008

(65) Prior Publication Data

US 2009/0295043 A1 Dec. 3, 2009

(51) Int. Cl.
*B29C 45/00* (2006.01)

(52) U.S. Cl.
USPC .............................. 425/577; 425/416; 425/122

(58) Field of Classification Search
USPC .............................. 264/287; 425/577, 122, 416
See application file for complete search history.

(56) References Cited

U.S. PATENT DOCUMENTS

| | | | |
|---|---|---|---|
| 2,700,631 A | 1/1955 | Sussenbach et al. | |
| 2,753,596 A | 7/1956 | Bailey | |
| 2,877,150 A | 3/1959 | Wilson | |
| 2,888,954 A | 6/1959 | Gates | |
| 2,931,069 A | 4/1960 | McCormick | |
| 3,081,102 A | 3/1963 | Murray et al. | |
| 3,379,805 A | 4/1968 | Roberts | |
| 3,490,496 A | 1/1970 | Stearns | |
| 3,538,209 A | 11/1970 | Hegler | |
| 3,573,871 A | 4/1971 | Warner | |
| 3,605,232 A | 9/1971 | Hines | |
| 3,649,730 A | 3/1972 | Lachenmayer et al. | |
| 3,677,676 A | 7/1972 | Hegler | |
| 3,714,311 A * | 1/1973 | Stefanka | 264/507 |
| 3,725,565 A | 4/1973 | Schmidt | |
| 3,802,908 A | 4/1974 | Emmons | |
| 3,819,292 A | 6/1974 | Wentworth | |
| 3,824,886 A | 7/1974 | Hegler | |
| 3,837,364 A | 9/1974 | Jenner | |
| 3,869,235 A | 3/1975 | Moore | |

(Continued)

FOREIGN PATENT DOCUMENTS

| | | |
|---|---|---|
| DE | 1 278 734 | 9/1968 |
| DE | 1 704 718 | 7/1971 |

(Continued)

OTHER PUBLICATIONS

PCT International Search Report and the Written Opinion of the International Searching Authority, for PCT/US2009/003216, dated Dec. 28, 2009.

(Continued)

*Primary Examiner* — Amjad Abraham
(74) *Attorney, Agent, or Firm* — Finnegan Henderson Farabow Garrett & Dunner, LLP (57) ABSTRACT

A mold is provided for forming a continuously-extruded parison into a corrugated pipe. The mold includes a mold housing having a plurality of bores, a mold cavity having a plurality of annular corrugations, and a plurality of punches. Each punch is disposed in one of the bores and aligned with one of the annular corrugations of the mold cavity. Each punch is also configured to form an aperture in a corrugation of a corrugated pipe in the mold. A continuous extrusion blow molding system and a method are also provided for forming a hollow plastic product and punching a continuously-extruded, blow molded product before it is released from a mold.

13 Claims, 6 Drawing Sheets

(56) References Cited

U.S. PATENT DOCUMENTS

| | | | |
|---|---|---|---|
| 3,944,641 A | 3/1976 | Lemelson | |
| 3,957,386 A | 5/1976 | Lupke | |
| 4,042,661 A | 8/1977 | Cook | |
| 4,113,411 A | 9/1978 | Terragni | |
| 4,116,608 A * | 9/1978 | Uhlig | 425/525 |
| 4,118,968 A * | 10/1978 | Ames | 72/328 |
| 4,165,214 A | 8/1979 | Lupke et al. | |
| 4,180,357 A | 12/1979 | Lupke | |
| 4,218,164 A | 8/1980 | Lupke | |
| 4,219,293 A | 8/1980 | Licht | |
| 4,220,181 A | 9/1980 | Nyssen | |
| 4,223,895 A | 9/1980 | Roberts, Jr. et al. | |
| 4,230,157 A | 10/1980 | Larsen et al. | |
| 4,262,162 A | 4/1981 | Plinke et al. | |
| 4,281,981 A | 8/1981 | Feldman | |
| 4,303,104 A * | 12/1981 | Hegler et al. | 138/121 |
| 4,313,905 A * | 2/1982 | Hafele | 264/532 |
| 4,319,476 A | 3/1982 | Fuchs, Jr. | |
| 4,319,872 A * | 3/1982 | Lupke et al. | 425/532 |
| 4,352,701 A | 10/1982 | Shimba et al. | |
| 4,377,545 A | 3/1983 | Hornbeck | |
| 4,397,797 A | 8/1983 | Nojiri et al. | |
| 4,402,658 A | 9/1983 | Larsen | |
| 4,415,389 A | 11/1983 | Medford et al. | |
| 4,436,679 A | 3/1984 | Winstead | |
| 4,439,130 A | 3/1984 | Dickhut et al. | |
| 4,492,551 A | 1/1985 | Hegler et al. | |
| 4,523,613 A | 6/1985 | Fouss et al. | |
| 4,528,832 A | 7/1985 | Fuchs, Jr. | |
| 4,534,923 A * | 8/1985 | Lupke | 264/156 |
| 4,547,246 A | 10/1985 | Viriyayuthakorn et al. | |
| 4,562,990 A | 1/1986 | Rose | |
| 4,572,523 A | 2/1986 | Guettouche et al. | |
| 4,588,546 A | 5/1986 | Feil et al. | |
| 4,666,649 A | 5/1987 | Takubo et al. | |
| 4,678,526 A | 7/1987 | Hawerkamp | |
| 4,683,166 A | 7/1987 | Yuto et al. | |
| 4,703,639 A | 11/1987 | Fuchs, Jr. | |
| 4,756,339 A | 7/1988 | Buluschek | |
| 4,779,651 A | 10/1988 | Hegler et al. | |
| 4,789,327 A | 12/1988 | Chan et al. | |
| 4,808,098 A | 2/1989 | Chan et al. | |
| 4,846,660 A | 7/1989 | Drossbach | |
| 4,849,113 A | 7/1989 | Hills | |
| 4,854,416 A | 8/1989 | Lalikos et al. | |
| 4,862,728 A | 9/1989 | Hardouin | |
| 4,862,924 A | 9/1989 | Kanao | |
| 4,900,503 A | 2/1990 | Hegler et al. | |
| 4,906,496 A | 3/1990 | Hosono et al. | |
| 4,970,351 A | 11/1990 | Kirlin | |
| 5,045,254 A | 9/1991 | Peelman et al. | |
| 5,058,934 A | 10/1991 | Brannon | |
| 5,089,074 A | 2/1992 | Winter et al. | |
| 5,124,109 A | 6/1992 | Drossbach | |
| 5,129,428 A | 7/1992 | Winter et al. | |
| 5,129,429 A | 7/1992 | Winter et al. | |
| 5,129,685 A | 7/1992 | Engel | |
| 5,145,545 A | 9/1992 | Winter et al. | |
| 5,156,901 A | 10/1992 | Tanaka | |
| 5,192,834 A | 3/1993 | Yamanishi et al. | |
| 5,222,288 A | 6/1993 | Thomas | |
| 5,228,479 A | 7/1993 | Thomas | |
| 5,256,233 A | 10/1993 | Winter et al. | |
| 5,262,109 A | 11/1993 | Cook | |
| 5,275,544 A | 1/1994 | Marlowe | |
| 5,279,332 A | 1/1994 | Winter et al. | |
| 5,314,553 A | 5/1994 | Hashimoto et al. | |
| 5,330,600 A | 7/1994 | Lupke | |
| 5,346,384 A | 9/1994 | Hegler et al. | |
| 5,372,774 A | 12/1994 | Lupke | |
| 5,383,497 A | 1/1995 | Winter et al. | |
| 5,383,998 A | 1/1995 | Lupke | |
| 5,391,334 A | 2/1995 | Enomoto | |
| 5,394,904 A | 3/1995 | Winter et al. | |
| 5,405,569 A * | 4/1995 | Lupke | 264/504 |
| 5,441,083 A | 8/1995 | Korsgaard | |
| 5,460,771 A | 10/1995 | Mitchell et al. | |
| 5,462,090 A | 10/1995 | Winter et al. | |
| 5,466,402 A | 11/1995 | Lupke | |
| 5,469,892 A | 11/1995 | Noone et al. | |
| 5,472,659 A | 12/1995 | Hegler et al. | |
| 5,472,746 A | 12/1995 | Miyajima et al. | |
| 5,522,718 A | 6/1996 | Dietrich | |
| 5,531,952 A | 7/1996 | Hatfield | |
| 5,545,369 A | 8/1996 | Lupke | |
| 5,572,917 A | 11/1996 | Truemner et al. | |
| 5,608,637 A | 3/1997 | Wang et al. | |
| 5,620,722 A | 4/1997 | Spina | |
| 5,649,713 A | 7/1997 | Ledgerwood | |
| 5,706,864 A | 1/1998 | Pfleger | |
| 5,715,870 A | 2/1998 | Winter et al. | |
| 5,759,461 A | 6/1998 | Jarvenkyla et al. | |
| 5,773,044 A | 6/1998 | Dietrich et al. | |
| 5,848,618 A | 12/1998 | Guest | |
| 5,894,865 A | 4/1999 | Winter et al. | |
| 5,901,754 A | 5/1999 | Elsässer et al. | |
| 5,904,643 A | 5/1999 | Seeberger et al. | |
| 5,909,908 A | 6/1999 | Furuse | |
| 5,912,023 A | 6/1999 | Katoh et al. | |
| 5,975,143 A | 11/1999 | Järvenkylä et al. | |
| 5,976,298 A | 11/1999 | Hegler et al. | |
| 6,000,434 A | 12/1999 | Winter et al. | |
| 6,016,848 A | 1/2000 | Egres, Jr. | |
| 6,039,082 A | 3/2000 | Winter et al. | |
| 6,062,268 A | 5/2000 | Elsässer et al. | |
| 6,082,741 A | 7/2000 | Gregoire et al. | |
| 6,161,591 A | 12/2000 | Winter et al. | |
| 6,186,182 B1 | 2/2001 | Yoon | |
| 6,199,592 B1 | 3/2001 | Siferd et al. | |
| 6,240,969 B1 | 6/2001 | Wildermuth | |
| 6,335,101 B1 | 1/2002 | Haeger et al. | |
| 6,399,002 B1 | 6/2002 | Lupke et al. | |
| 6,405,974 B1 | 6/2002 | Herrington | |
| 6,461,078 B1 | 10/2002 | Presby | |
| 6,491,994 B1 | 12/2002 | Kito et al. | |
| 6,524,519 B1 | 2/2003 | Ohba et al. | |
| 6,555,243 B2 | 4/2003 | Flepp et al. | |
| 6,591,871 B2 | 7/2003 | Smith et al. | |
| 6,607,010 B1 | 8/2003 | Kashy | |
| 6,631,741 B2 | 10/2003 | Katayama et al. | |
| 6,645,410 B2 | 11/2003 | Thompson | |
| 6,672,324 B2 * | 1/2004 | Jarvenkyla | 137/15.01 |
| 6,682,677 B2 | 1/2004 | Lobovsky et al. | |
| 6,696,011 B2 | 2/2004 | Yun et al. | |
| 6,719,302 B2 | 4/2004 | Andrick | |
| 6,787,092 B2 | 9/2004 | Chan et al. | |
| 6,848,464 B2 | 2/2005 | Ransom | |
| 6,848,478 B2 | 2/2005 | Nagai | |
| 6,854,168 B2 | 2/2005 | Booms et al. | |
| 6,933,028 B2 | 8/2005 | Milhas | |
| 6,935,378 B2 | 8/2005 | Ikemoto et al. | |
| 6,955,780 B2 | 10/2005 | Herrington | |
| 7,074,027 B2 | 7/2006 | Starita | |
| 7,114,944 B2 | 10/2006 | Wolfe et al. | |
| 7,118,369 B2 | 10/2006 | Dietrich et al. | |
| 7,122,074 B2 | 10/2006 | Kim | |
| 7,140,859 B2 | 11/2006 | Herrington | |
| 7,156,128 B1 | 1/2007 | Kanao | |
| 7,185,894 B2 | 3/2007 | Kish et al. | |
| 7,347,225 B2 | 3/2008 | Nobileau | |
| 2002/0179232 A1 | 12/2002 | Thompson | |
| 2004/0146696 A1 | 7/2004 | Jones | |
| 2004/0187946 A1 | 9/2004 | Herrington | |
| 2004/0241368 A1 | 12/2004 | Iwata et al. | |
| 2005/0161947 A1 | 7/2005 | Skinner et al. | |
| 2006/0293159 A1 | 12/2006 | Neubauer | |
| 2007/0204929 A1 | 9/2007 | Jarvenkyla | |
| 2008/0118596 A1 | 5/2008 | Hetzner et al. | |

FOREIGN PATENT DOCUMENTS

| | | |
|---|---|---|
| DE | 2 042 031 | 5/1972 |
| DE | 2 413 878 | 2/1976 |
| DE | 2 403 618 | 12/1980 |

(56) References Cited

FOREIGN PATENT DOCUMENTS

| | | |
|---|---|---|
| DE | 2 804 540 C2 | 1/1984 |
| DE | 297 06 045 | 6/1997 |
| EP | 0 041 252 | 12/1981 |
| EP | 0 108 598 A2 | 5/1984 |
| EP | 0 096 957 B1 | 5/1989 |
| EP | 0 385 465 A2 | 3/1990 |
| EP | 0 385 465 B1 | 3/1990 |
| EP | 0 726 134 B1 | 2/1996 |
| EP | 0 543 243 B1 | 2/1997 |
| EP | 0 600 214 B1 | 3/1998 |
| EP | 0 890 770 A2 | 5/1998 |
| EP | 0 890 770 B1 | 5/1998 |
| EP | 1 293 718 A2 | 3/2003 |
| EP | 1 475 213 A1 | 11/2004 |
| EP | 0 600 214 B2 | 4/2006 |
| FR | 1 486 473 | 6/1967 |
| GB | 1 148 277 | 4/1969 |
| GB | 2 300 684 | 11/1996 |
| JP | 56144943 | 11/1981 |
| JP | 57160518 | 10/1982 |
| JP | 58168422 | 10/1983 |
| JP | 59 026224 | 2/1984 |
| JP | 59114027 | 6/1984 |
| JP | 61135416 | 6/1986 |
| JP | 06 64062 | 3/1994 |
| JP | 08-258175 | 10/1996 |
| JP | 08-258176 | 10/1996 |
| JP | 08 267128 | 10/1996 |
| JP | 2003062891 | 3/2003 |
| WO | WO 85/00140 | 1/1985 |
| WO | WO 98/12046 | 3/1998 |
| WO | WO 01/79737 A1 | 10/2001 |
| WO | WO 2004/094888 A1 | 11/2004 |

OTHER PUBLICATIONS

Foerst, Dr. Wilhelm, Ullmanns Encyklopädie der technischen Chemia, Urban & Schwarzenberg, Munchen, Berlin, Germany, pp. 52-53, 71-73, 1960.

U.S. Appl. No. 11/078,323, filed Mar. 14, 2005, entitled "Corrugated Pipe with Outer Layer".

Non-final Office Action dated Jul. 3, 2007, in U.S. Appl. No. 11/078,323.

Final Office Action dated Dec. 27, 2007, in U.S. Appl. No. 11/078,323.

Non-final Office Action dated May 29, 2008, in U.S. Appl. No. 11/078,323.

*Modern Plastics Worldwide*, Apr. 2008 edition, p. 35, "Device offers alternative for constant flow filtration."

\* cited by examiner

IN-MOLD PUNCH APPARATUS AND METHODS

TECHNICAL FIELD

The present disclosure relates to in-mold punching of continuously extruded and blow molded products, and more particularly, to an in-mold punch apparatus and related methods for manufacturing corrugated polymer pipe.

BACKGROUND OF THE DISCLOSURE

In continuously extruded blow molding processes, a hollow tube of melted polymer, or "parison", is typically extruded through an annular die and into a moving mold. As the parison enters the moving mold, it is expanded with pressurized air or gas to force it into the shape of the mold. In some cases, a vacuum is also applied to the cavity within the mold to draw the parison against the interior walls of the mold. As the molten parison takes the hollow shape of the mold, and travels with the mold away from the hot extruder, air or gas within the hollow center of the molded polymer cools. As the air cools and becomes denser, a partial vacuum may form in the hollow center of the molded polymer. In some instances, the vacuum formed in the hollow center of the molded polymer may cause the molded plastic shape of the polymer to exhibit inner wall roughness, or even to collapse, unless a venting hole is formed to allow air to enter the hollow center before the molded plastic fully sets.

When discrete products, such as plastic containers, are intermittently blow molded, these products may be already vented and/or released from their respective molds and punctured within sufficient time to prevent a cooling vacuum from causing product deformation. Likewise, if a relatively small diameter and/or short corrugated pipe is continuously-extruded and blow molded, for example, a venting hole may be punched into the pipe as soon as the pipe releases from a mold but before the pipe becomes susceptible to cooling-induced deformation.

It has been found, however, that some products may be too large, or continuously-extruded too slowly, to avoid deformation if only vented after being released from their respective molds. For example, in the manufacture of large diameter corrugated pipe, such as that disclosed in U.S. patent application Ser. Nos. 11/078,323 and 12/019,738 to Goddard et al., it may not be sufficient to punch venting holes into the pipe only after the corrugation molds have released the pipe. Such large diameter corrugated pipe may be disposed inside a corrugator or vacuum chamber for a period of time (i.e., "residence time") so long that the pipe may be subjected to cooling-induced deformation. Blow molding of dual wall corrugated pipe may be especially susceptible to cooling-induced deformation because a smooth inner wall may seal off an annular area associated with each corrugation of the pipe.

Accordingly, there is a need for an in-mold punch apparatus and related methods for manufacturing corrugated polymer pipe.

SUMMARY OF THE DISCLOSURE

It is an object of the present disclosure to provide such an in-mold punch apparatus and related methods for manufacturing corrugated polymer pipe.

One exemplary embodiment of the present disclosure provides a mold for forming a continuously-extruded parison into a corrugated pipe. The mold includes a mold housing having a plurality of bores, a mold cavity having a plurality of annular corrugations, and a plurality of punches. Each punch is disposed in one of the bores and aligned with one of the annular corrugations of the mold cavity. Each punch is further configured to form an aperture in a corrugation of a corrugated pipe in the mold.

Another exemplary embodiment of the present disclosure provides a mold for shaping a continuously-extruded parison into a hollow plastic product. The mold includes an exterior surface defining a mold housing, an interior surface defining a mold cavity, and a plurality of punches. Each punch extends from the exterior surface defining the mold housing to the interior surface defining the mold cavity. Each punch is configured to form an aperture in the hollow plastic product while the hollow plastic product is disposed in the mold cavity.

Yet another exemplary embodiment of the present disclosure provides a continuous extrusion blow molding system for forming a hollow plastic product. The system includes an extruder for extruding a hollow plastic product; a plurality of molds, each mold having a cavity for shaping the hollow plastic product, and a plurality of punches extendable into the cavity of the mold; and a cam track extending from the extruder to a distal point. Each punch has a cam follower disposed outside of the mold cavity and configured to engage and travel along the cam track, such that the punch corresponding to each cam follower is configured to form an aperture in the hollow plastic product when the cam track urges the cam follower in a direction towards the mold cavity.

Yet another exemplary embodiment of the present disclosure provides a method of punching a continuously-extruded, blow molded product before the product is released from a mold. The method includes the steps of: continuously extruding a parison from a die head; urging the parison to expand into the mold to form a hollow product; punching an aperture into the hollow product; and releasing the hollow product from the mold.

In this respect, before explaining at least one embodiment of the disclosure in detail, it is to be understood that the invention is not limited in its application to the details of construction and to the arrangements of the components set forth in the following description or illustrated in the drawings. The invention is capable of embodiments in addition to those described herein and of being practiced and carried out in various ways. Also, it is to be understood that the phraseology and terminology employed herein, as well as the abstract, are for the purpose of description and should not be regarded as limiting.

The accompanying drawings illustrate certain exemplary embodiments of the present disclosure, and together with the description, serve to explain the principles of the invention.

As such, those skilled in the art will appreciate that the conception upon which this disclosure is based may readily be utilized as a basis for designing other structures, methods, and systems for carrying out the several purposes of the present disclosure. It is important, therefore, to recognize that the claims should be regarded as including such equivalent constructions insofar as they do not depart from the spirit and scope of the present disclosure.

DESCRIPTION OF THE EXEMPLARY EMBODIMENTS

Reference will now be made in detail to the exemplary embodiments of the disclosure described above and illustrated in the accompanying drawings.

Figure 1:
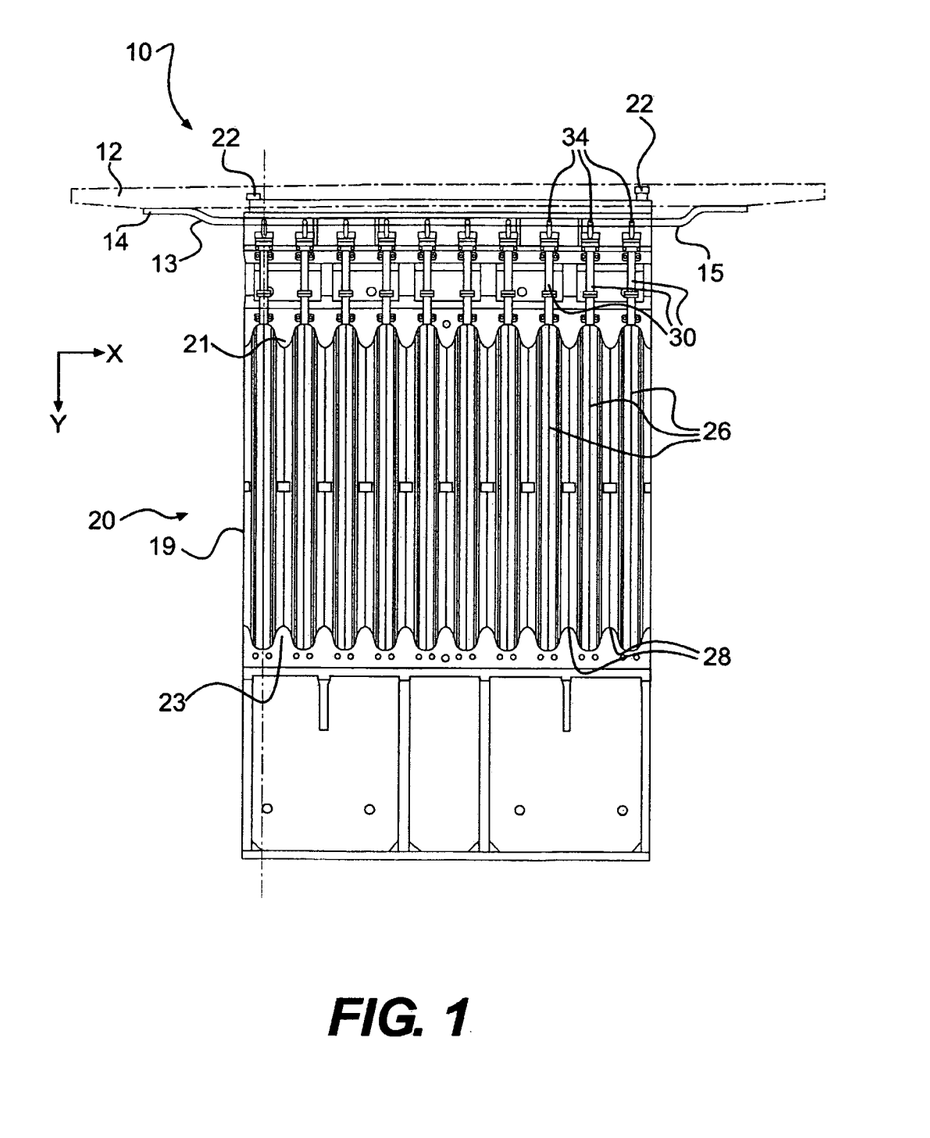
FIG. 1 is a partial, cross-sectional side view of an exemplary in-mold punching system.

FIG. 1 illustrates an exemplary embodiment of an in-mold punching system 10. In-mold punching system 10 may include a mold track 12, a cam track 14, and a mold 20. Mold 20 may be configured to move along the mold track 12, in the direction X, as guided by mold track followers 22. For example, the mold track 12 may extend from an extruder (not shown) to a distal location, such that mold 20 may move away from the extruder. In one embodiment, a plurality of molds 20 may be disposed adjacent to each other along the mold track 12, each mold 20 being configured to translate along the mold track 12 away from an extruder.

In one embodiment, mold 20 may have a plurality of punches 30 disposed therein. Each punch 30 may have a corresponding cam follower 34, which may be engaged with the cam track 14. Accordingly, as mold 20 moves along the mold track 12, a cam follower 34 of each punch 30 may be configured to similarly move along the cam track 14. In one embodiment of the present disclosure, the cam track 14 may be shaped in a manner that selectively urges the punches 30 to engage a cavity of the mold 20. For example, as illustrated in FIG. 1, the cam track 14 may include an engaging portion 13 and a disengaging portion 15. As the mold 20 moves along the mold track 12, the cam followers 34 may engage corresponding punches 30 when the cam followers 34 encounter the engaging portion 13 and disengage corresponding punches 30 when the cam followers 34 encounter the disengaging portion 15. In other words, when the cam followers 34 are urged in the direction Y by the cam track 14, the punches 30 may be actuated. It will be appreciated by one of skill in the art that the cam track 14 may be formed into virtually any shape suitable for desirably engaging the punches 30.

Figure 2:
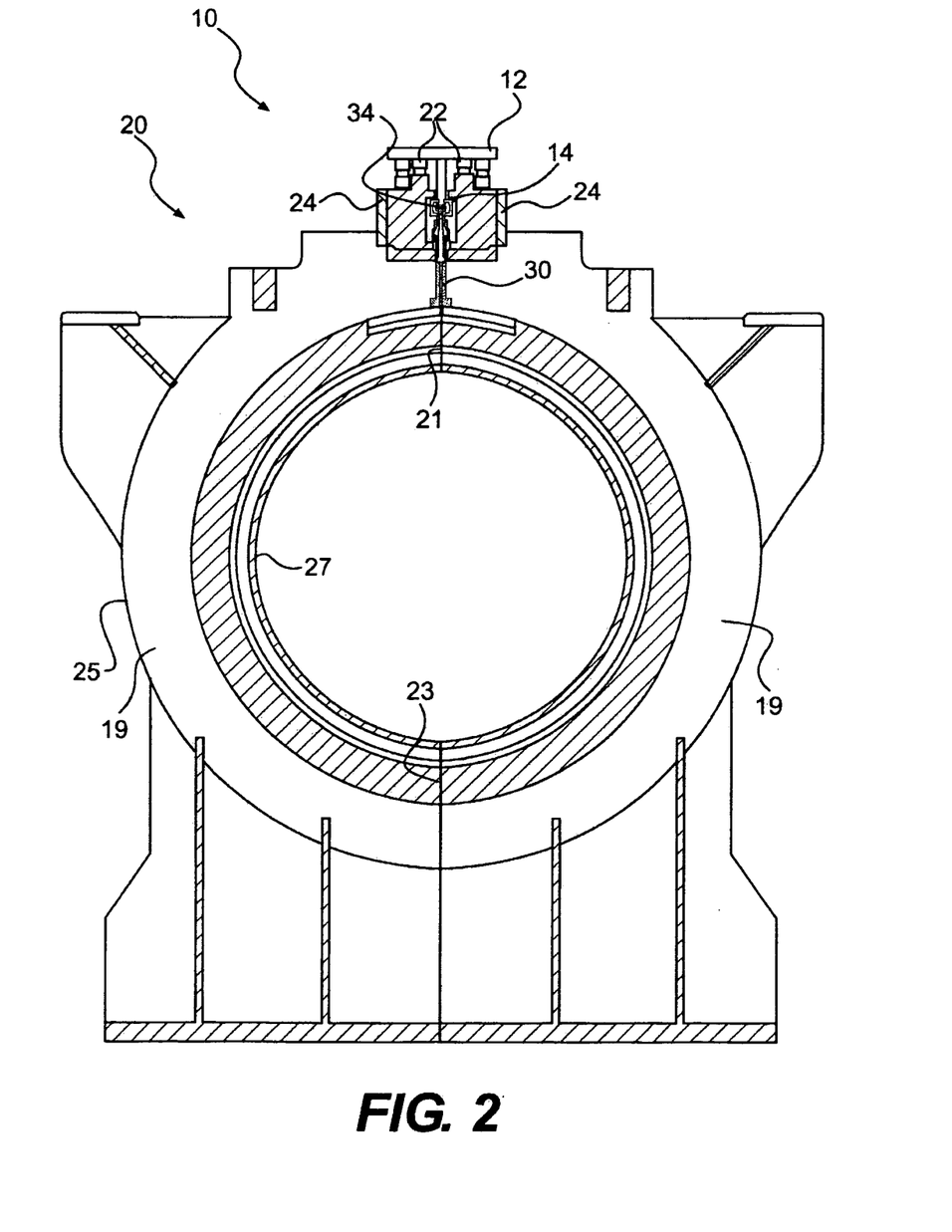
FIG. 2 is a cross-sectional front view of the exemplary in-mold punching system of FIG. 1.

FIG. 1 is a cross-sectional side view illustrating a particular embodiment in which the mold 20 includes at least one mold half 19. FIG. 2 is a cross-sectional front view of two opposing mold halves 19 engaged with the in-mold punching system of FIG. 1. Specifically, FIG. 2 illustrates the in-mold punching system 10 including the mold track 12, cam track 14, and mold 20. In one embodiment, mold 20 may include two opposing semi-circular mold halves 19 that, when mated with each other, form an annular mold 20 suitable for forming a section of annular corrugated pipe. For example, each mold half 19 may be selectively joined with an opposing mold half 19 along an upper mating face 21 and a lower mating face 23 (see FIGS. 1 and 2). In this embodiment, the two mold halves 19 may have their respective mating faces 21, 23 joined along a "parting line," which runs vertically through a central plane that intersects the cam track 14. When the two mold halves 19 are joined together, the mold 20 may have an exterior surface 25 that substantially defines a housing of the mold 20, as well as an interior surface 27 that defines a cavity of the mold 20. In addition, as shown in FIG. 1, each mold half 19 may include alternating crest portions 26 and valley portions 28 for forming alternating crests and valleys in a corrugated polymer pipe formed therein.

Figure 3:
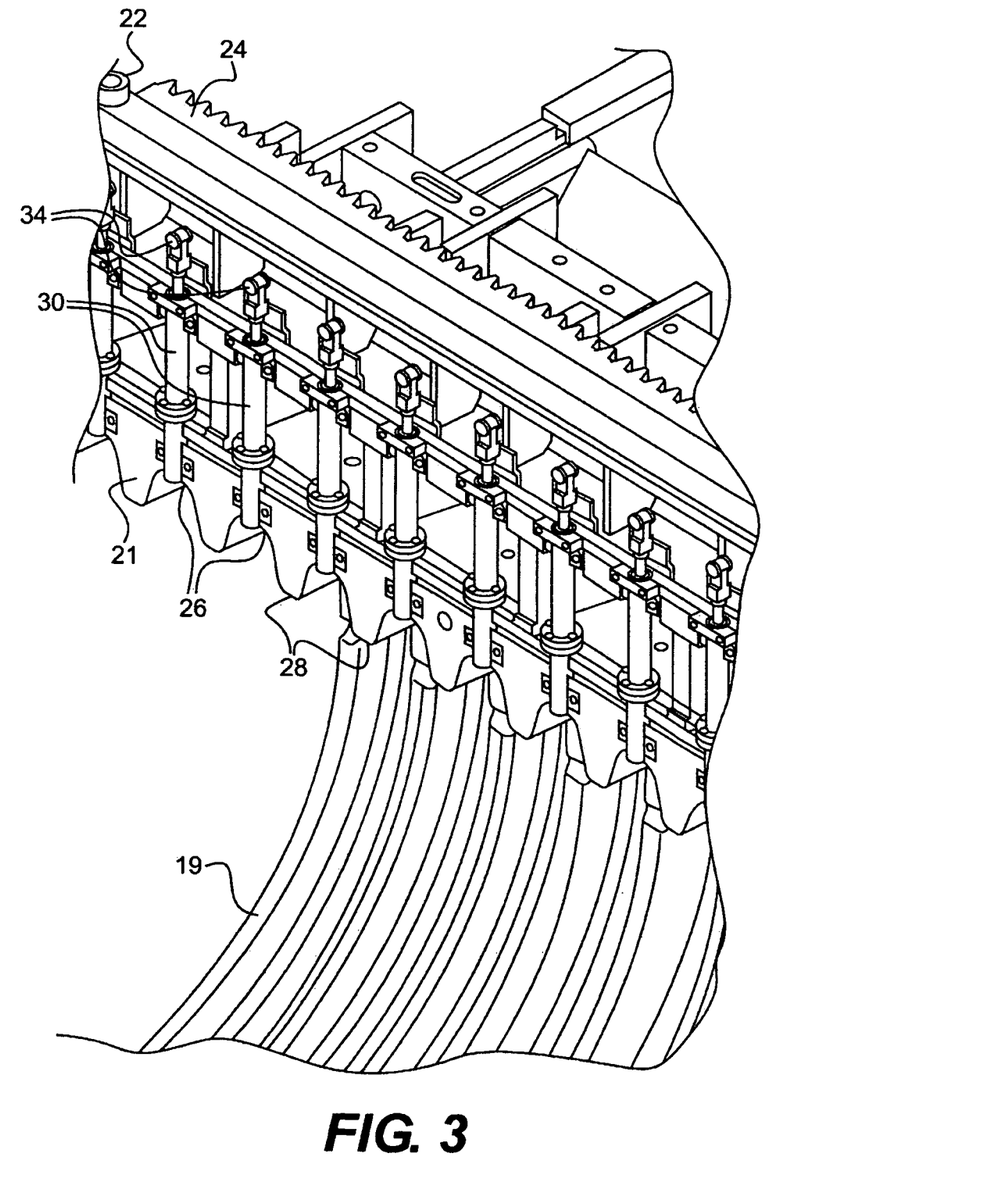
FIG. 3 is a partial, perspective view of an exemplary mold half having a plurality of exemplary in-mold punches disposed therein.

FIG. 3 is a partial perspective view of an exemplary embodiment of a mold half 19. FIG. 3 also illustrates an exemplary geometry of the annular crest portions 26 and valley portions 28. FIG. 3 further depicts the cam followers 34 of each punch 30, without depicting the cam track 14, which would obscure the cam followers 34 in this perspective view. As depicted in FIGS. 1-3, each punch 30 may be aligned with a crest portion 26 of the mold 20. Accordingly, each crest portion 26 may be provided with a punch 30, which is configured to puncture semi-molten polymer recently blow molded and/or vacuum suctioned into the crest portion 26. By punching venting holes into crest portions of the pipe, air may be allowed to enter the pipe as it sets in the mold, thereby preventing crests of the pipe from deforming as air cools and condenses inside the pipe. Alternatively, gas, foam, or any other material may be injected into the venting holes to prevent the crests of the pipe from deforming. FIGS. 2 and 3 also illustrate one of the mold track followers 22 and a rack gear 24. Each mold half 19 may be provided with such a rack gear 24, which allows each mold half 19 to be propelled by a pinion or other gear along the mold track 12, as guided by the mold track followers 22. In one embodiment, each mold half 19 may have a mold track follower 22 disposed at each end of a rack gear 24.

Figure 4:
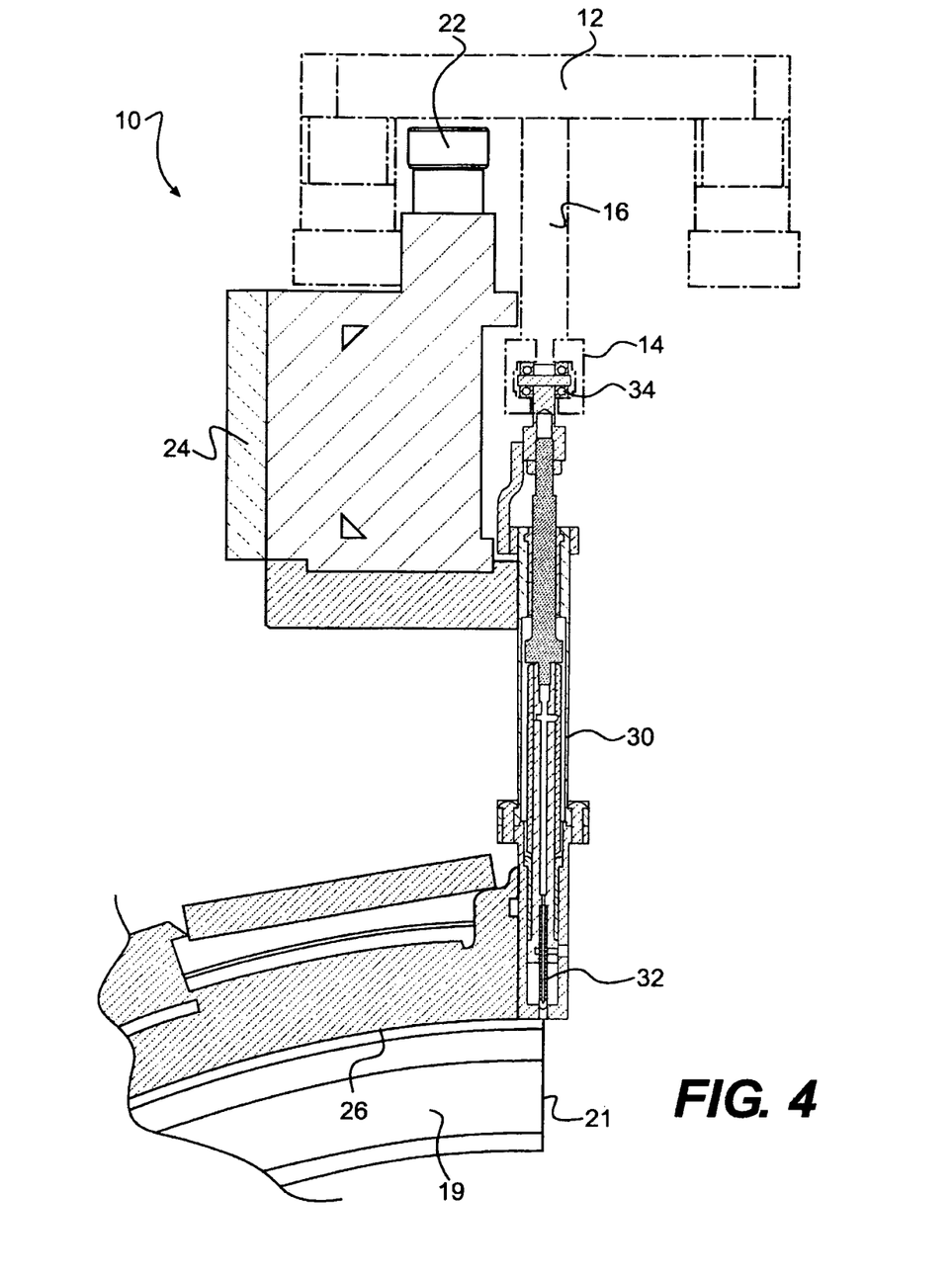
FIG. 4 is a partial, cross-sectional front view of an exemplary mold half and in-mold punch.

In one embodiment of the disclosure, each punch 30 may be aligned with the upper mating face 21 of the mold half 19, such that it may be disposed substantially evenly across upper portions of two adjacent mold halves 19. In such an embodiment, each punch 30 may be configured to puncture the pipe along an upper parting line between the two mold halves 19. Moreover, only one mold half 19 of a pair of opposing mold halves 19 may have the plurality of punches 30 affixed thereto. FIG. 4 illustrates a partial cross-section of the mold track 12 and cam track 14 having a mold half 19 and a punch 30 engaged therein, respectively. The cam track 14 may be attached to the mold track 12 by a flange 16. Flange 16 may vary in geometry in any way that suitably positions the cam track 14 for selectively engaging cam followers 34 of the punches 30. As described above with respect to FIGS. 2 and 3, the mold half 19 may be propelled along the mold track 12 via the rack gear 24 and the mold track followers 22.

In general, each punch 30 may be disposed between the cam track 14 and a cavity of the mold 20. In the embodiment of FIG. 4, the punch 30 is illustrated as having a cam follower 34 disposed at a first end and engaged with the cam track 14. The punch 30 may have a needle 32 disposed at an opposite end, in line with the mating face 21 of the mold half 19. The needle 32 may also be configured to puncture a polymer layer disposed in a corresponding crest portion 26 of the mold 20. In one embodiment, the needle 32 may be hollow, such that air or gas may enter the corresponding corrugation of the pipe formed in the mold 20. For example, the needle 32 may have an aperture disposed along a side of the needle that aligns with a corresponding aperture in the punch 30. The needle and punch apertures may be disposed in fluid communication with the atmosphere or any source of air or gas. In addition, the needle 32 may be a self-cleaning needle, such as a hollow, translatable needle having a fixed small diameter needle therein for dislodging any polymer material stuck in a tip of the hollow needle 32. Any number of such punches 30 and their corresponding needles 32 may be disposed along a mold half 19 of each mold 20, and more particularly, at each crest portion 26 in the mold half 19. It will be appreciated by one of skill in the art that an opposing mold half 19 may be similarly engaged with the mold track 12 on an opposite side of the cam track 14 and flange 16 from the mold 19 illustrated in FIG. 4. Moreover, such an opposing mold half 19 may have a number of semi-circular bores formed therein, each being configured to surround a portion of a punch 30 not surrounded by the opposing mold half 19. Accordingly, each punch 30 may generally have a cylindrical barrel disposed in a cylindrical bore formed between two opposing mold halves 19.

By disposing the punches 30 along the parting line of opposing mold halves 19 (i.e., aligned with adjacent upper mating faces 21), the punches 30 may avoid interfering with various cooling mechanisms incorporated into housings of the mold 20. For example, the mold 20 may have various water and/or air cooling conduits disposed in the mold housing, for the purpose of cooling blow molded plastic recently disposed in the mold 20. Accordingly, it may be advantageous to position the punches 30 along a set of adjacent upper mating faces 21, proximate to the mold track 12 and above the mold 20, as illustrated in FIGS. 1-4. However, it may be advantageous to alternatively position the punches 30 along a set of adjacent lower mating faces 23 (see FIGS. 1 and 2), in the event that a mold track 12 and cam track 14 are provided below the translating molds 20 (not shown), instead of above them (as shown in FIGS. 1 and 2). In this embodiment, the in-mold punching system 10 may be less susceptible to the various effects of thermal expansion. For example, if punches 30 are disposed between a lower cam track and a lower set of mating faces 23, then the substantial mass of the mold housings may expand and contract above the lower cam track without significantly affecting the desired engagement between the cam followers 34 and the lower cam track.

Figure 5:
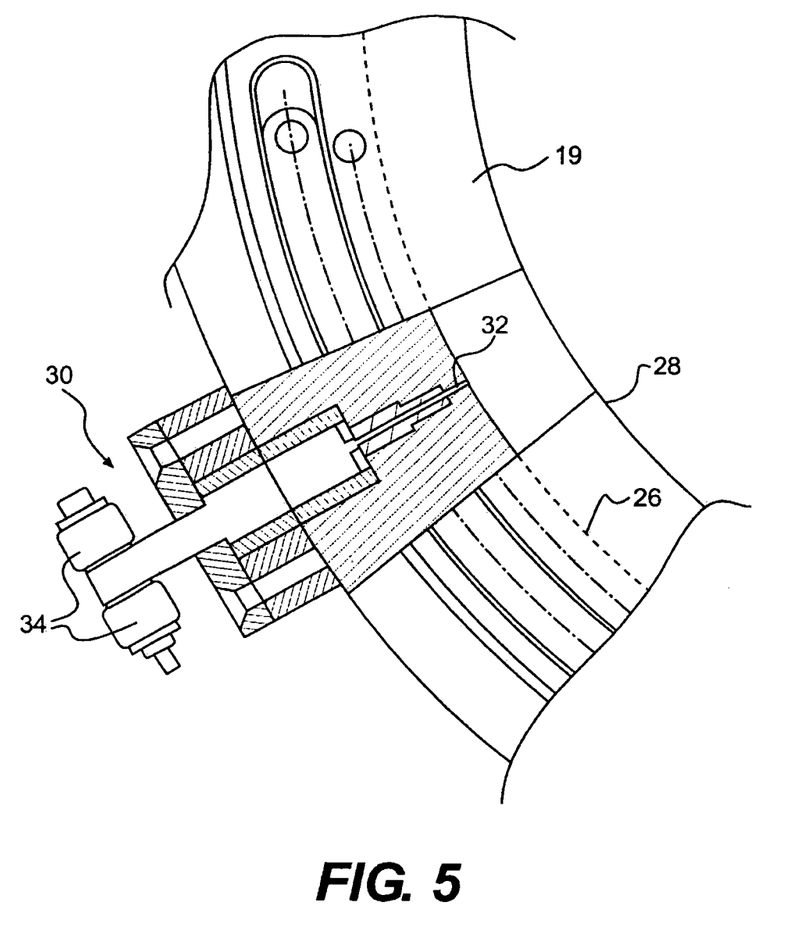
FIG. 5 is a partial, cross-sectional view of another exemplary in-mold punching system.

In yet another embodiment, the punches 30 may not be disposed along the parting line at all. For example, as illustrated in the embodiment of FIG. 5, a plurality of punches 30 may be disposed anywhere along a side of a mold 20. FIG. 5 generally illustrates a cross-section of a punch 30 having a cam follower 34 and a needle 32. The needle 32 may extend into the mold 20 up to a crest portion 26 such that the needle is configured to selectively puncture a polymer layer disposed therein. This embodiment may be particularly useful in molds having either no cooling conduits, or cooling conduits, such as air conduits, that are not substantially impeded by side-mounted punches 30, such as that illustrated in FIG. 5.

Figure 6A:
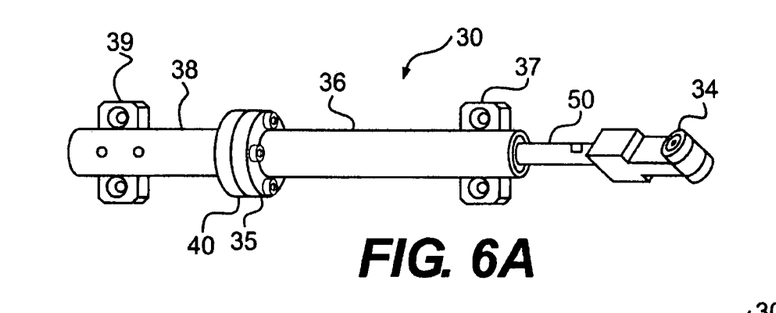
FIG. 6A is a perspective view of an exemplary in-mold punch.
Figure 6B:
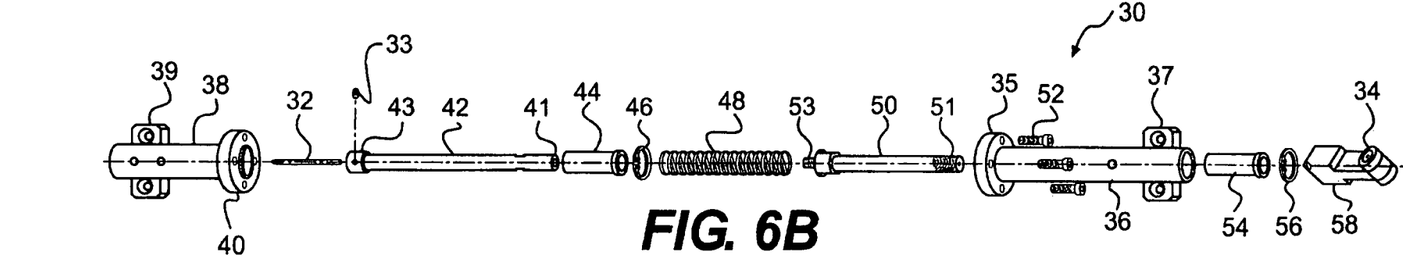
FIG. 6B is an exploded view of the exemplary in-mold punch of FIG. 6A.
Figure 6C:
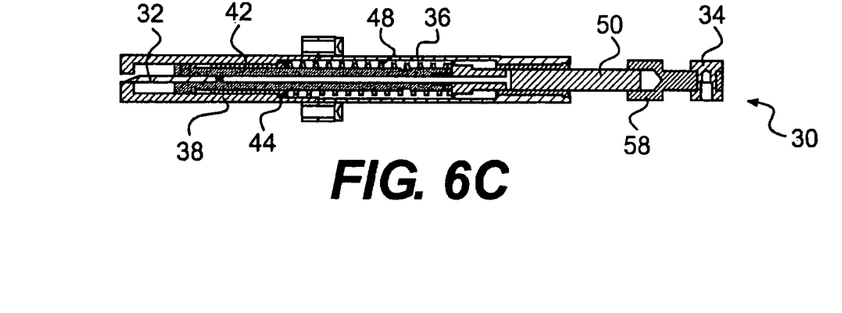
FIG. 6C is a cross-sectional view of the exemplary in-mold punch of FIG. 6A.

FIGS. 6A-6C illustrate detailed views of an exemplary embodiment of a punch 30. FIG. 6A illustrates a perspective view of the punch 30. In one embodiment, the punch 30 may include a first housing 36 having a first flange 35 attached to a second flange 40 of a second housing 38. The first and second housings 36, 38 may constitute a substantially cylindrical barrel that can be accommodated in a corresponding bore of a mold housing. The first housing 36 may have a first mounting plate 37 and the second housing 38 may include a second mounting plate 39, each of the mounting plates being configured to attach its corresponding housing to a portion of a mold, such as a crest portion 26 of the mold 20 described in FIGS. 1-5. The punch 30 of FIG. 6A may also have a cam follower 34 affixed to a plunger 50, which may be translatably mounted inside at least the first housing 36.

FIG. 6B is an exploded view of the exemplary punch 30 of FIG. 6A. In particular, FIG. 6B illustrates the first housing 36 being configured to accept a first sleeve 54, a first washer 56, and the plunger 50 therein. The plunger 50 may be in threaded engagement with a cam follower post 58 by a first end 51 of the plunger 50. At a second end 53 of the plunger 50, the plunger 50 may be in threaded engagement with a first end 41 of an extension rod 42. A second sleeve 44, a second washer 46, and a compression spring 48 may be disposed around the extension rod 42. A needle 32 may also be disposed in the second end 43 of the extension rod 42 and may be selectively fixed with a set screw 33. Accordingly, the needle 32 may be quickly and easily replaced in the extension rod 42. Upon assembly of the above described punch mechanisms, the punch mechanisms may be enclosed within the first and second housings 36, 38, which may be joined at their respective first and second flanges 35, 40 by bolt screws 52.

FIG. 6C illustrates a cross-section of the exemplary punch 30 in its assembled state. In this embodiment, the needle 32, extension rod 42, plunger 50, and cam follower post 58 may all translate axially along an interior axis of the barrel formed by the first and second housings 36, 38. In particular, the needle 32 may be retracted into the second housing 38 when the cam follower 34 is not engaged by a corresponding cam track 14 or other suitable mechanism. In one embodiment, the plunger 50, as urged by its corresponding cam follower 34, must press against the force of the compression spring 48 in order to urge the needle 32 out of the second housing 38. It will be appreciated by one of skill in the art that the above-described punch mechanisms may be replaced with any other suitable combination of extension rods, washers, sleeves, and/or springs, as long as the needle 32 is configured to be selectively translated between a housing, such as the second housing 38, and a corresponding mold cavity, such as a crest portion 26 of the mold 20.

For example, in another embodiment, the mold 20 may be provided with a plurality of through holes, each through hole being aligned in a crest portion 26 of the mold 20. A single punch may be disposed outside of the mold 20 such that the punch selectively passes through each through hole of the mold 20, and engages a pipe crest disposed therein, as the mold 20 travels along a mold track relative to the single, fixed punch.

The presently disclosed in-mold punching system 10, mold 20, and in-mold punch 30 may be particularly advantageous in improving the continuous extrusion blow molding processes used in the manufacture of corrugated polyethylene pipe. For example, the in-mold punch 30 may be useful in forming venting holes in the corrugated layer of a co-extruded, dual-wall, polyethylene pipe. However, the embodiments described herein may be applicable to virtually any extruded and blow molded polyolefin product. Moreover, although the presently disclosed in-mold punching system 10 is described with respect to cam track and cam follower actuation, it will be appreciated by one of skill in the art that any variety of actuation may be used for selectively engaging punches disposed within a mold. For example, various contemplated in-mold punches, such as the exemplary disclosed punch 30, may be actuated by any other type of mechanical, electromechanical, and/or hydraulic mechanisms, pressurized air, or a vacuum (such as the same vacuum used for drawing the parison into the mold).

In operation, the exemplary disclosed in-mold punching system 10 may be used in a method of punching continuously extruded and blow molded products. The method may include extruding a parison from a die head, blowing an internal diameter of the parison with pressurized air, and drawing a vacuum on an external diameter of the parison, so as to urge the parison into the mold. The method may further include punching or puncturing the parison as it cools in the mold. For example, the parison may be punched immediately before or after the vacuum has ceased drawing on the parison. In some embodiments, a mold must move the length of one mold section before it has exited a vacuum manifold. Using an in-mold punch system, such as the exemplary disclosed in-mold punching system 10, the parison may be punched after it is pulled into the mold but before a vacuum has ended. Alternatively, the parison may be punched after the vacuum ends but substantially before two opposing halves 19 of a mold section 20 have opened. For example, the parison may be punched immediately after the vacuum has ended. It will be appreciated by those of skill in the art that, if the parison is punched when it is still too hot, the parison may close up, or "self-heal," the venting hole. On the other hand, if the parison is punched too late, the in-mold punch 30 may not perform one of its desired functions of mitigating the inner wall roughness and other deformation phenomena resulting from cooling inside the continuously blow molded product. Accordingly, one of skill in the art will provide a cam track or other suitable actuation with the proper shape and/or timing mechanisms for advantageously venting a continuously-extruded and blow molded product at a desirable time during its residence in the mold.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A mold for forming a continuously-extruded parison into a corrugated pipe, the mold comprising:
    a mold housing comprising first and second opposing mold halves configured to mate along an upper interface and a lower interface, the upper interface defining a plurality of bores;
    a mold cavity having a plurality of annular corrugations; and
    a plurality of punches, each punch being disposed in one of the bores defined by the upper interface of the opposing mold halves, and each punch being aligned with one of the annular corrugations of the mold cavity;
    wherein each punch is configured to form an aperture in a corrugation of a corrugated pipe in the mold;
    wherein the mold is configured to move along a mold track, and the plurality of punches are configured to move along an actuator track connected to the mold track;
    wherein the actuator track includes a disengaging portion and an engaging portion;
    wherein, when the plurality of punches move along the actuator track from the disengaging portion to the engaging portion, the engaging portion is configured to actuate the plurality of punches to form apertures in corrugations of the corrugated pipe.

2. The mold of claim 1, wherein each punch has a spring that biases a needle of the punch away from the mold cavity.

3. The mold of claim 2, wherein the needle of each punch is configured to translate between a first position, in which the needle is retracted into the mold housing, and a second position, in which the needle extends through the mold housing and into the mold cavity.

4. The mold of claim 1, wherein each punch has a cylindrical barrel disposed in a cylindrical bore formed between the first and second opposing mold halves.

5. The mold of claim 4, wherein each punch has a translatable rod disposed in the cylindrical barrel of the punch, said translatable rod being extendable from the mold housing into the mold cavity.

6. The mold of claim 5, wherein each punch has a cam follower at a first end of the translatable rod proximate to the mold housing and a needle at a second end of the translatable rod proximate to the mold cavity.

7. The mold of claim 6, wherein the needle, translatable rod, and cam follower are configured to translate along an axis of the cylindrical barrel of the punch.

8. The mold of claim 1, wherein each punch includes a self-cleaning needle for forming the aperture.

9. A mold for shaping a continuously-extruded parison into a hollow plastic product, the mold comprising:
    an exterior surface defining a mold housing comprising first and second opposing mold halves configured to mate along an upper interface and a lower interface, the upper interface defining a plurality of bores;
    an interior surface defining a mold cavity; and
    a plurality of punches;
    wherein each punch extends, through one of the bores defined by the upper interface of the opposing mold halves, from the exterior surface defining the mold housing to the interior surface defining the mold cavity, each punch being configured to form an aperture in a corrugation of the hollow plastic product while the hollow plastic product is disposed in the mold cavity;
    wherein the mold is configured to move along a mold track, and the plurality of punches are configured to move along an actuator track connected to the mold track;
    wherein the actuator track includes a disengaging portion and an engaging portion;
    wherein, when the plurality of punches move along the actuator track from the disengaging portion to the engaging portion, the engaging portion is configured to actuate the plurality of punches to for apertures in corrugations of the hollow plastic product.

10. The mold of claim 9, wherein each punch has a spring that biases a needle of the punch away from the mold cavity.

11. The mold of claim 10, wherein the needle of each punch is configured to translate between a first position, in which the needle is retracted into the mold housing, and a second position, in which the needle extends through the mold housing and into the mold cavity.

12. The mold of claim 9, wherein each punch has a cylindrical barrel disposed in a bore formed between the first and second opposing mold halves.

13. The mold of claim 12, wherein each punch comprises:
    a translatable rod being disposed in the cylindrical barrel of the punch and extendable between the exterior surface defining the mold housing and the interior surface defining the mold cavity;
    a cam follower at a first end of the translatable rod proximate to the exterior surface of the mold housing; and
    a needle at a second end of the translatable rod proximate to the interior surface of the mold cavity;
    wherein the needle, translatable rod, and cam follower are configured to translate along an axis of the cylindrical barrel of the punch.

* * * * *

UNITED STATES PATENT AND TRADEMARK OFFICE
CERTIFICATE OF CORRECTION

| | | |
|---|---|---|
| PATENT NO. | : 8,550,807 B2 | Page 1 of 1 |
| APPLICATION NO. | : 12/128192 | |
| DATED | : October 8, 2013 | |
| INVENTOR(S) | : Randall A. Kolbet | |

It is certified that error appears in the above-identified patent and that said Letters Patent is hereby corrected as shown below:

In the Claims:

Claim 9, col. 8, line 39, "punches to for apertures" should read --punches to form apertures--.

Signed and Sealed this
Tenth Day of December, 2013

Margaret A. Focarino
*Commissioner for Patents of the United States Patent and Trademark Office*